Elliot & Seely,

Nut Washer.

No. 3,652. Reissued Sept. 28. 1869.

Inventors

D. Elliott

C. Seely

Per Munn & Co

Attorneys

Witnesses,

Theo Tusche

W. Irwin

United States Patent Office.

D. ELLIOT AND E. SEELY, OF NEW YORK, N. Y.

*Letters Patent No.* 74,060, *dated February* 4, 1868; *reissue No.* 3,652, *dated September* 28, 1869.

IMPROVEMENT IN WASHER FOR LOCK-NUTS.

The Schedule referred to in these Letters Patent and making part of the same.

*To all whom it may concern:*

Be it known that we, D. ELLIOT and E. SEELY, of the city and State of New York, have invented and made a certain new and useful Improvement in Lock-Nuts and Washers; and we do hereby declare the following to be a full, clear, and exact description of the same, reference being had to the annexed drawing, making part of this specification, wherein—

Similar marks of reference denote the same parts.

Our invention relates to a means for preventing a nut from becoming loose, by turning back on the thread, when exposed to concussion or strain.

We make use of a nut with a series of teeth upon it, held by a spring or springs, formed with the washer, and we fit the said washer so that it will not turn.

This device is cheap, and effectually prevents the nut working loose, especially when employed for the fish-plates of railroad-bars, or under other circumstances of strain and concussion.

B represents the screw-bolt, with the head *a* and thread *b*.

A is the piece of wood or other article through which the bolt B passes.

Figure 1:
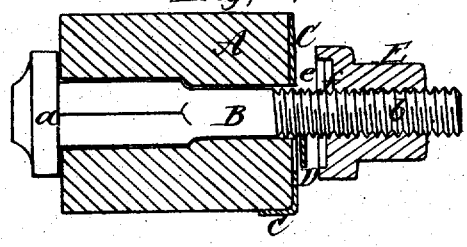
Figure 1 is a section of the washer and nut at the line *x x*, fig. 2, the bolt not being in section.
Figure 2:
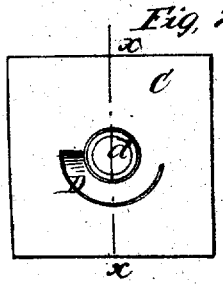
Figure 2 represents the washer.
Figure 3:
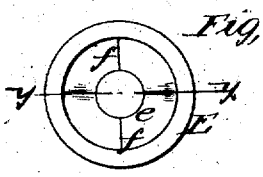
Figure 3 shows the inner end of the nut.
Figure 4:
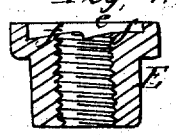
Figure 4 is a section of the nut at the line *y y*, fig. 3.

C is the washer, and E, the nut. These are to be adapted, in size and shape, to the use intended. The washer C is to be prevented from turning on the bolt, and various plans may be devised for that purpose. For instance, one side, edge, or angle of the washer may be bent over, as shown at *c*, fig. 1, to form a projection, to take against the side of the article, or to enter a countersink in A, or a burr or projection may be punched up or formed in the metal of the washer, for the same purpose.

The spring-pawl D is formed of the metal of the washer C, by cutting a tongue and bending up the end to form the spring-pawl.

The nut E is formed with ratchet-teeth, *f*, at the inner end, to take the pawl D. We have shown said ratchet-teeth as made in the bottom of a chamber, *e*, but we do not limit ourselves in this particular.

Figure 5:
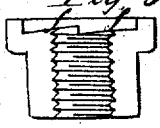
Figure 5 is a similar view, showing a slight variation in the shape of the ratchet-teeth.

The edges of the ratchet-teeth may be made angular, as in fig. 5, so that the pawl effectually prevents the nut being turned back, except by breaking the pawl. Or the ends of said teeth may be slightly rounding or inclined, so that the pawl will be pressed back when the nut is exposed to a powerful wrench to turn it back. The nut made with teeth of the character first mentioned should only be used in cases where it is not necessary to unscrew the nut at any time. The nut with teeth, of the character last mentioned, can be used where it is necessary to unscrew the nut occasionally. In either form, the pawl acting upon the nut, will prevent the same turning back, or accidentally becoming unscrewed.

We do not claim a pawl or burr on the nut itself, made for the purpose of preventing the nut turning.

It will be evident that this sheet-metal washer is a very cheap and simple device for locking the nut, and that it is in a position protected from injury, and its use involves very little change in the nut, or the part against which the washer rests.

What we claim, and desire to secure by Letters Patent, is—

1. A nut formed with ratchet-teeth at its inner end, in combination with a sheet-metal washer, having a pawl made of the sheet-metal of the said washer, substantially as set forth.

2. The washer, formed out of sheet-metal, substantially as set forth.

In witness whereof, we have hereunto set our signatures, this 12th day of January, A. D. 1869.

D. ELLIOT.
E. SEELY.

Witnesses:
GEO. D. WALKER,
CHAS. H. SMITH.